United States Patent
Mowry et al.

[19]

[11] Patent Number: 5,953,238
[45] Date of Patent: *Sep. 14, 1999

[54] METHOD FOR GENERATING CONTROL SYSTEM SETPOINTS WITH IMPLICIT DEPENDENCIES

[75] Inventors: Christofer M. Mowry, Morgan Hill, Calif.; Israel Nir, Jackson, Miss.

[73] Assignee: General Electric Company, Schenectady, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/614,023

[22] Filed: Mar. 12, 1996

[51] Int. Cl.⁶ .................................................... G06F 15/00
[52] U.S. Cl. ........................................................ 364/578
[58] Field of Search ............................ 364/578; 376/283, 376/307, 237, 215; 136/253; 444/1

[56] References Cited

U.S. PATENT DOCUMENTS

| | | | |
|---|---|---|---|
| 3,919,720 | 11/1975 | Alliston | 444/1 |
| 4,605,530 | 8/1986 | Tatemichi | 376/237 |
| 4,707,324 | 11/1987 | Storrick | 376/215 |
| 4,717,532 | 1/1988 | Schwab | 376/283 |
| 4,728,486 | 3/1988 | Kish | 376/307 |
| 4,836,862 | 6/1989 | Pelka et al. | 136/253 |
| 5,552,984 | 9/1996 | Crandall et al. | 364/578 |
| 5,572,125 | 11/1996 | Dunkel | 324/307 |
| 5,619,433 | 4/1997 | Wang et al. | 364/578 |
| 5,687,291 | 11/1997 | Smyth | 395/10 |

OTHER PUBLICATIONS

Miller et al., The ARIES–I High–Field–Tokamak Reactor: Design–Point Determination and Parametric Studies, IEEE, pp. 1027–1030, Oct. 2, 1989.

*Primary Examiner*—Kevin J. Teska
*Assistant Examiner*—Matthew Loppnow
*Attorney, Agent, or Firm*—Armstrong, Teasdale, Schlafly & Davis

[57] ABSTRACT

A method for modeling linear control systems that are asymptotically stable provided that any initial deviation is within a definite bound is described. The method includes the steps of generating a parametric model of the quasi steady state system, generating a time-invariant parametric mapping function, using the system model, to relate a system setpoint parameter at a system setpoint function to an input process parameter implicit in a system implicit parameter, and generating an interface protocol to adjust the time-invariant parametric mapping function to account for any time-dependent variations in the relative performance between the input process parameter and the implicit system parameter.

23 Claims, 8 Drawing Sheets

FIG_3

FIG_4

FIG_5

FIG_12

METHOD FOR GENERATING CONTROL SYSTEM SETPOINTS WITH IMPLICIT DEPENDENCIES

FIELD OF THE INVENTION

This invention relates generally to control systems and, more particularly, to control systems for use in nuclear reactors.

BACKGROUND OF THE INVENTION

The instrumentation and control systems in operating nuclear power plants typically undergo numerous modifications over the reactor life. Many of the modifications focus on upgrading or replacing the plant instrumentation and control infrastructure. The modifications primarily are driven by the need to resolve emerging safety issues and the need to improve operating efficiencies and thermal power generation.

To offset reductions in baseline operating margins that may accompany the modifications, such modifications often include the requirement to improve instrumentation and process modeling accuracy. Since many existing nuclear power plant control systems are based on a single input/single output architecture, significant simplifications and approximations are made, with concomitant conservatism introduced into the associated protective system setpoints. More particularly, significant conservatism often exists in current single input/single output control systems. These conservatism accommodate system calibration constraints, modeling simplifications, and the constraints of the single input/single output architecture, all of which serve to reduce the desired accuracy and margin between a system setpoint function, which is used to initiate automatic protective functions for the system, and the system operating envelope, which defines the operating surface of the system. To efficiently accommodate plant modifications that reduce plant operating margins, these conservatism should be eliminated or reduced.

The most direct method of eliminating inherent approximations and assumptions in existing instrumentation and control systems is to modify the instrumentation to accommodate a multiple input/multiple output architecture, usually with the aid of digital microcomputer technology. However, this method is often not pursued in nuclear power plants due to nuclear power plant backfit constraints associated with the modifications. Specifically, it is often not economical to completely replace entire plant instrumentation systems. Typically only the signal processing components are replaced while leaving the original sensor package largely intact.

It would be desirable to improve modeling accuracy for nuclear reactor instrumentation and control systems to take into account parametric dependencies among the system process variables in generating the system setpoint function. It also would be desirable to provide a method for addressing parametric dependencies in plant system modeling, within the constraints of existing control system architectures, for rigorously eliminating control system conservatism to address important third parameter effects in a single input/single output control system.

SUMMARY OF THE INVENTION

These and other objects are attained by a method for generating system setpoint reference functions in linear control systems that are asymptotically stable provided that any initial deviation is within a definite bound. That is, the present method can be used to generate system setpoint reference functions in a quasi steady state system which returns to a quasi steady state mode of operation over time for any initial deviation within a definite bound. The setpoint reference functions provide a single input/single output relationship between a system setpoint parameter and an input process parameter.

In general, the permitted operating envelope of a nuclear power plant, termed the system operating envelope, is a restricted subset of a system operating surface. To prevent undesirable operation outside the system operating envelope, the protective system setpoint function typically is identified. Control systems initiate automatic protective functions when plant operation is significantly outside the permitted system operating envelope, as defined by the system setpoint function.

In addition to the system operating surface, the system operating envelope, and the system setpoint function as defined above, a number of state parameters are used in modeling a control system in accordance with the present invention. These state parameters include a system implicit parameter which is analytically established as the independent variable of the system setpoint function, and a system setpoint parameter which is compared directly against the system setpoint function value (setpoint) of the control system to determine when the protection function is to be initiated. In addition, an input process parameter is defined as the single plant system input used by the control system to identify the system setpoint function value. The present method, which is sometimes referred to as an implicit parametric modeling (IPM) methodology, incorporates both analytical and empirical information associated with another state parameter, i.e., the system implicit parameter, to rigorously establish a relationship between the system setpoint parameter and the input process parameter to generate a setpoint reference function.

The IPM methodology is composed of three major elements. First, a parametric model of the quasi-steady state system is generated in terms of the three system state parameters, i.e, the system implicit parameter, the system setpoint parameter, and the input process parameter. Second, a time-invariant parametric mapping function is analytically defined, using the system model, to relate the system setpoint parameter at the system setpoint function to the input process parameter, implicit in the system implicit parameter. In one embodiment, the relationship is established by analytically collapsing the three dimensional system operating surface into a two-dimensional space defined by the control system input process parameter and the system setpoint parameter. The collapse is performed along the system setpoint function to ensure that the implicit parametric dependency on the system implicit parameter is addressed at the critical location on the system operating surface. Third, an interface protocol is generated to adjust the time-invariant parametric mapping function to account for any time-dependent variations in the relative performance between the input process parameter and the implicit system parameter. The input process parameter is aligned, as system performance changes, using empirical plant data.

Utilizing the IPM methodology in the control system design maintains compatibility of the control system with the original overall single input/single output architecture yet provides the potential for realizing significant reductions in uncertainty and approximation, with concomitant elimination of conservatism. Specifically, the IPM methodology described above improves modeling accuracy for control systems by taking into account parametric dependencies among the system process variables and addresses important parametric dependencies in plant system modeling, within the constraints of existing control system architectures, for rigorously eliminating unnecessary control system conservatism.

DETAILED DESCRIPTION OF THE DRAWINGS

The present methodology is sometimes described herein in the context of nuclear reactor control systems. It should be understood, however, that the methodology is not limited to practice in connection with such nuclear reactor control systems and can be utilized in many other control system environments which satisfy the modeling requirements described below in more detail.

Figure 1:
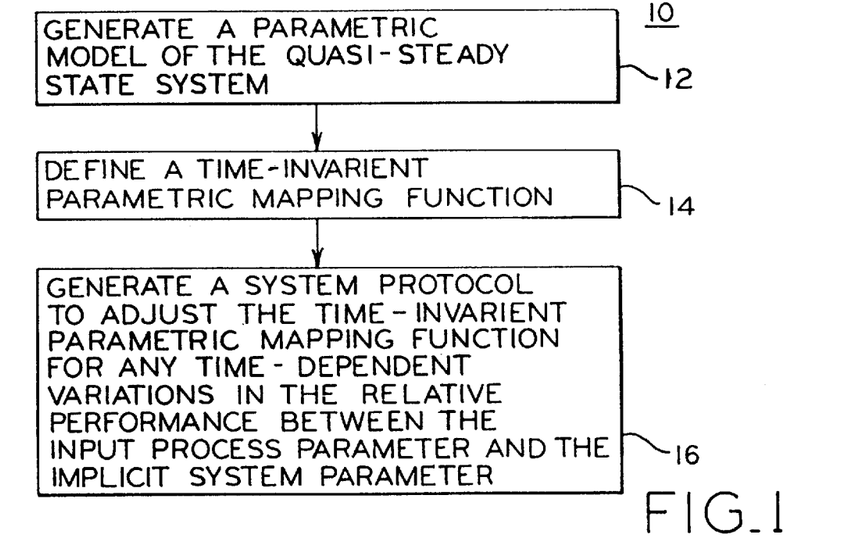
FIG. 1 is a flow chart illustrating process steps in accordance with one embodiment of the present invention.

FIG. 1 is a flow chart 10 illustrating process steps in accordance with one embodiment of the present invention. Each process step is briefly discussed here in connection with FIG. 1 and then described in more detail below. Specifically referring to FIG. 1, the present method includes the steps of generating 12 a parametric model of the quasi-steady state system. This model is generated using three system state parameters, i.e, the system implicit parameter, the system setpoint parameter, and the input process parameter. Next, a time-invariant parametric mapping function is analytically defined 14, using the system model, to relate the system setpoint parameter at the system setpoint function to the input process parameter, implicit in the system implicit parameter. Then, an interface protocol is generated 16 to adjust the time-invariant parametric mapping function to account for any time-dependent variations in the relative performance between the input process parameter and the implicit system parameter. Each of the above described process steps is described below in more detail.

Parametric Model

Figure 2:
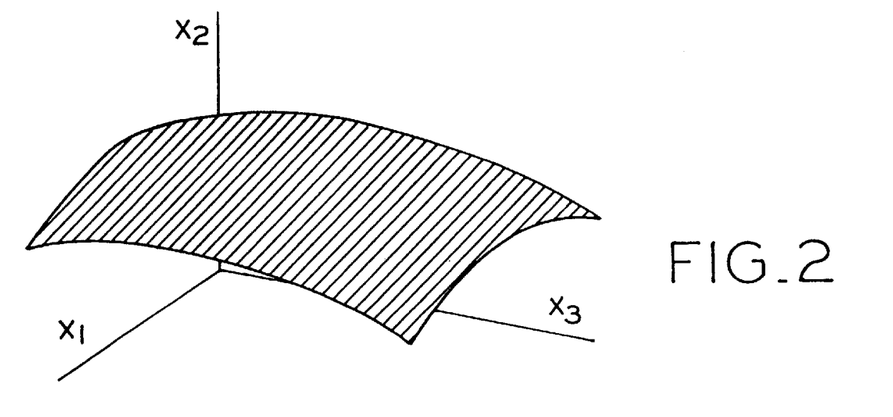
FIG. 2 illustrates a system operating surface.

For any plant system that can be modeled by a system of linear, continuous functions, and referring to FIG. 2, a set of system state points that defines all possible steady state operating conditions may be described by a time-invariant parametric function. When the system can be modeled with three state parameters, $x_1$, $x_2$ and $x_3$, a system operating surface is described by the relationship:

$$S(x_1, x_2, x_3) = \text{Constant}. \tag{1}$$

In steady-state, the system will always be operating somewhere on this surface, as illustrated by the system operating surface shown in FIG. 2.

A significant portion of nuclear power plant safety analysis is based on quasi steady state relationships among the relevant plant system parameters, consistent with the design and application of the corresponding plant control systems. The number of plant control systems to which Equation 1 may be properly applied is large. Such broad application is assured by a fundamental theorem of linear system analysis which provides that linear systems are asymptotically stable if they satisfy Equation 1 and if:

$$\|x(t) - \tilde{x}(t)\| > 0 \text{ as } t > \infty,$$

provided that the initial deviation is within a definite bound, $\rho$ $$\|x(t_0) - \tilde{x}(t_0)\| < \rho, \tag{2}$$

where $x(t)$ is the unperturbed system state, and $\tilde{x}(t)$ is the perturbed system state at time t.

The present IPM methodology is applicable to quasi steady state systems that satisfy the stability requirements of Equation 2 and were applied to control systems that either operate under conditions where the initial perturbation is small or when sufficient time has elapsed to ensure reasonable decay of the initial perturbation. When these requirements are satisfied, the system state may be characterized by Equation 1 for the purpose of control system design.

Figure 3:
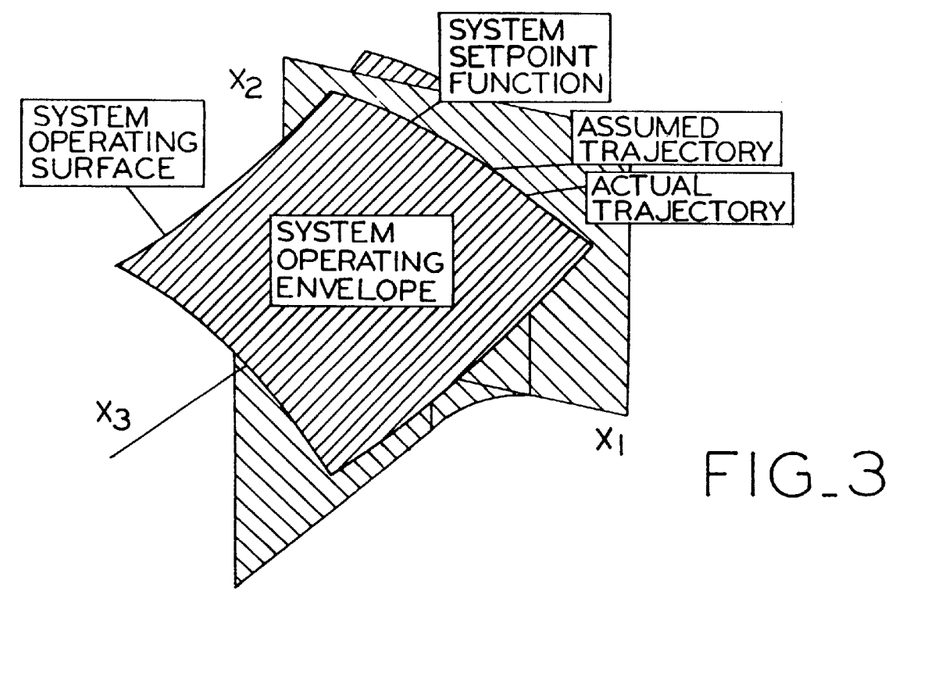
FIG. 3 illustrates a margin to system setpoint function.

In general, and referring to FIG. 3, the permitted operating envelope of a system, termed the system operating envelope, is a restricted subset of the system operating surface. To prevent undesirable operation outside this envelope, a protective system setpoint function is defined. Control systems are provided to initiate automatic protective functions when operation is significantly outside the permitted system operating envelope, as defined by the system setpoint function. The role of each of the three plant system state parameters within the IPM methodology is specifically defined, consistent with the relationship between the plant system model, control system design, and safety analysis, as illustrated in FIG. 3.

Parameter $x_1$ is termed the system implicit parameter and is analytically established as the independent variable of the system setpoint function. Parameter $x_2$ is termed the system setpoint parameter. It is compared directly against the system setpoint function value (setpoint) by the control system to determine when the protection function is to be initiated. Parameter $x_3$ is termed the input process parameter and is the single plant system input used by the control system to identify the system setpoint function value. The system setpoint function is described by the analytical relationship:

$$x_2 = g_{SSF}(x_1), \tag{3}$$

independent of the input process parameter.

Limitations in sensing plant system parameters and the relative sensitivities between various system state parameters to changes in plant operating conditions often dictate the process parameter that is used for the existing single input/single output control system input. When the input process parameter is not the parameter analytically defining the system setpoint function, equivalency assumptions are currently employed with corresponding conservatism introduced into the system setpoint function. In addition, nuclear power plants typically are not permitted to calibrate control systems at the state points associated with the system setpoint function because these state points lie outside the system operating envelope. As a result, the relationship between the input process parameter, $x_3$, and the system setpoint parameter, $x_2$, can only be calibrated onto the system operating surface inside the system operating envelope. These factors may result, as illustrated in FIG. 3, in the introduction of error and uncertainty in the control system setpoints prior to application of IPM methods. This occurs because the relationship between the system setpoint parameter and the input process parameter explicitly ignores the functional dependency on the third system state parameter (i.e., the system implicit parameter).

The system model generated in accordance with the present invention provides an analytical representation of the relationship between the three state parameters. It is convenient to express the system implicit parameter, $x_1$, in terms of the input process parameter $x_2$, and the system setpoint parameter, $x_3$:

$$x_1 = F(x_2, x_3). \tag{4}$$

The analytical model is assumed benchmarked to the physical system at a given point in time. Steady state relationships generated using this model are therefore assumed time-invariant, reflecting the benchmarked system state within the accuracy of the analytical model.

Parametric Mapping Function

The time-invariant parametric mapping function is analytically defined, using the system model, to relate the system setpoint parameter at the system setpoint function to the input process parameter, implicit in the system implicit parameter. This element leads to a relationship compatible with the single input/single output control system architecture. The relationship is established by analytically collapsing the three dimensional system operating surface into a two-dimensional space defined by the control system input process parameter, $x_3$, and the system setpoint parameter, $x_2$. The collapse is performed along the system setpoint function to ensure that the implicit parametric dependency on the system implicit parameter, $x_1$, is addressed at the critical location on the system operating surface.

More particularly, any system trajectory away from the system setpoint function on the system operating surface cannot in general be specified uniquely by the input process parameter since the trajectory may also be a function of the system implicit parameter. Therefore, for a single input/single output control system that is applied to a system described by three state parameters, one constraint must be introduced to rigorously address the dependency on the system implicit parameter. This is accomplished by requiring a unique mapping of each system state point in the system operating envelope onto a corresponding system setpoint function point. This is the basic requirement that permits the single input/single output architecture to be properly applied to three parameter situations. Specifically, for a given value of the input process parameter, $x_3$, the system implicit parameter is directly related to the system setpoint parameter. From Equation 4:

$$x_1 = F(x_2, x_3') \tag{5}$$

parametric in the input process parameter value, $x'_3$.

For a given input process parameter value, the system follows a trajectory prescribed by Equation 5. When the system setpoint parameter, $x_2$, intersects the system setpoint function provided by Equation 3, the control system initiates protective functions. Therefore, all system statepoints with input process parameter value of $x'_3$ are associated with common $x_1$ and $x_2$ values on the system setpoint function.

The parametric mapping function can now be established to uniquely relate the input process parameter, $x_3$, to the system implicit parameter, $x_1$, by substituting Equation 3 into Equation 5:

$$x_1 = F(g_{SSF}(x_1), x_3'), \tag{6}$$

and solving Equation 6 for each $x'_3$, value. This process results in the parametric mapping function expressed as:

$$x_1 = \Omega_{PMF}(x_3). \tag{7}$$

This function uniquely maps each input process parameter value in the system operating envelop to the proper corresponding system implicit parameter value on the system setpoint function. Finally, Equation 7 is substituted into Equation 3 to generate a setpoint reference function as a function of the input process parameter. The setpoint reference function provides the desired single input/single output relationship between the system setpoint parameter and the input process parameter:

$$x_2 = g_{SSF}(\Omega_{PMF}(x_3)). \tag{8}$$

Parametric Model Alignment

An interface protocol is generated to adjust the time-invariant parametric mapping function, described above, to account for any time-dependent variations in the relative performance between the input process parameter and the implicit system parameter. This provides a means to explicitly align the input process parameter, as system performance changes, using empirical plant data. The analytical mapping process is defined based on a time invariant model.

More specifically, the relationship described in Equation 8 is derived based on the model described by Equation 4. The model, and therefore Equation 8, assumes that functions of the system implicit parameter, $x_1$, remain time-invariant. Real steady state system performance, however, is not time invariant. Over time the relationship between the input process parameter and the system implicit parameter will deviate from the baseline system model. As a result, the parametric model of the system must be periodically aligned to reflect actual system performance. In order to permit the parametric mapping function to remain applicable, the actual measured input process parameter value must be aligned to the baseline value to ensure the proper system setpoint function value associated with the system implicit parameter value is selected.

To facilitate periodic system performance benchmarking and an appropriate control system alignment process, a specified alignment reference trajectory is defined inside the system operating envelope:

$$x_2 = g_{ART}(x_1),$$

$$x_1 = f_{ART}(x_3), \tag{9}$$

This trajectory must be time invariant and can be arbitrarily specified in the system operating envelope, provided it spans the expected range of the system parameters. Any variations in system performance are quantified relative to the alignment reference trajectory in terms of the input process parameter and appropriately incorporated into Equation 8. Since the parametric mapping function is assumed time-invariant, appropriate evaluation of the alignment impact on the parametric mapping function is required to establish continued applicability. For sufficiently large variations in system performance, a new system baseline model and the accompanying parametric mapping function and alignment reference trajectory are required.

When alignment is required, an alignment correction for the input process parameter is established based on new benchmark baseline data gathered along the alignment reference trajectory. The new data is either collected along or normalized to the trajectory defined by $x_2=g_{ART}(x_1)$ (see Equation 9). This data results in a new trajectory termed the alignment measured trajectory:

$$x_2=g_{ART}(x_1),$$

$$x_t=f_{AMT}(x_3). \tag{10}$$

Figure 4:
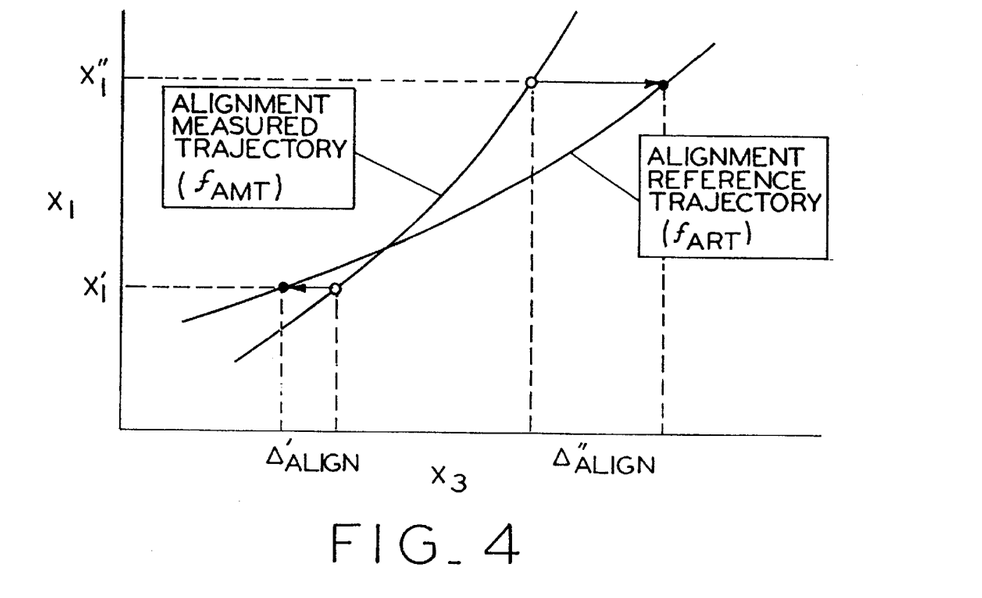
FIG. 4 illustrates the input process parameter alignment process.

An alignment correction, $\Delta_{ALIGN}$, can be established as a function of the measured input process parameter value ($\tilde{X}_3$), by conserving the implicit system parameter value, $x_1$:

$$f_{AMT}(\tilde{x}_3)=f_{ART}(\tilde{x}_3+\Delta_{ALIGN}), \tag{11}$$

as illustrated in FIG. 4.

Equation 8 is now generalized to include compensations for any system performance changes by incorporating the alignment correction established from Equation 11:

$$x_2=g_{SSF}(\Omega_{PMF}(\tilde{x}_3+\Delta_{ALIGN})), \tag{12}$$

where $\tilde{x}_3$ is the measured value of the input process parameter.

Criterion for continued applicability of the parametric mapping function may be formulated to require that the system model, including benchmarking, satisfies the following property, based on Equation 5:

$$\left| \frac{d}{dx_2} F(x_2, x_3') \bigg|_{x_2'}^{analytical} - \frac{d}{dx_2} F(x_2, x_3') \bigg|_{x_2'}^{empirical} \right| \leq \epsilon \tag{13}$$

for any value of $x'_3$, where $\epsilon$ is sufficiently small. $x_2^{analytical}$ and $x_2^{empirical}$ refer to the analytical system model value and the measured value of the system setpoint parameter at a common $x'_3$ value. As a result, within the context of the parametric mapping function, trajectories on the system operating surface defined by the analytical model of Equation 5 are equivalent to empirical values of the input process parameter if:

$$|x_3^{empirical}-x_3^{analytical}|_{x_1'/x_2'} \leq \delta, \tag{14}$$

where $x'_1$ and $x'_2$ represent any common point and $\delta$ is defined consistent with $\epsilon$ of Equation 13. Equations 13 and 14 define the interface requirements between the analytical parametric mapping function and the actual control system input signal The IPM methodology described above maintains compatibility of the control system with the original overall single input/single output architecture yet provides the potential for realizing significant reductions in uncertainty and approximation, with concomitant elimination of conservatism. Specifically, the IPM methodology described above improves modeling accuracy for control systems by taking into account parametric dependencies among the system process variables and addresses important parametric dependencies in plant system modeling, within the constraints of existing control system architectures, for rigorously eliminating unnecessary control system conservatism.

EXAMPLE

The IPM methodology described above is discussed below in a Boiling Water Reactor (BWR) control system modification. Particularly, BWRs incorporate protection systems for over-power conditions which consists of reactor trip setpoints as a function of reactor coolant recirculation flow. As described below, IPM is performed to eliminate excessive uncertainty, and the attendant conservatism, from the flow dependent overpower trip setpoint functions.

In the existing design, the setpoint uncertainty is introduced by an assumed proportionality between two of the system parameters within the setpoint methodology. This existing approach was sufficient for the original non-safety-related application of the control system. However, in this particular modification, the control system is assigned a safety-related designation that requires a more accurate specification of the trip setpoint function. The inaccuracies introduced by the existing approach result from approximations of the relationships between the modeled system parameters.

Reactor Operating Surface

The BWR flow recirculation performance is primarily related to the global reactor system parameters consisting of core flow, $W_T$, core power, P, and recirculation drive flow, $W_D$. These parameters are functionally related by the thermal hydraulic characteristics of the reactor and form a steady-state system operating surface which relates the reactor state parameters in the three dimensional operating space by:

$$W_T=f_{SURF}(P, W_D). \tag{15}$$

Figure 5:
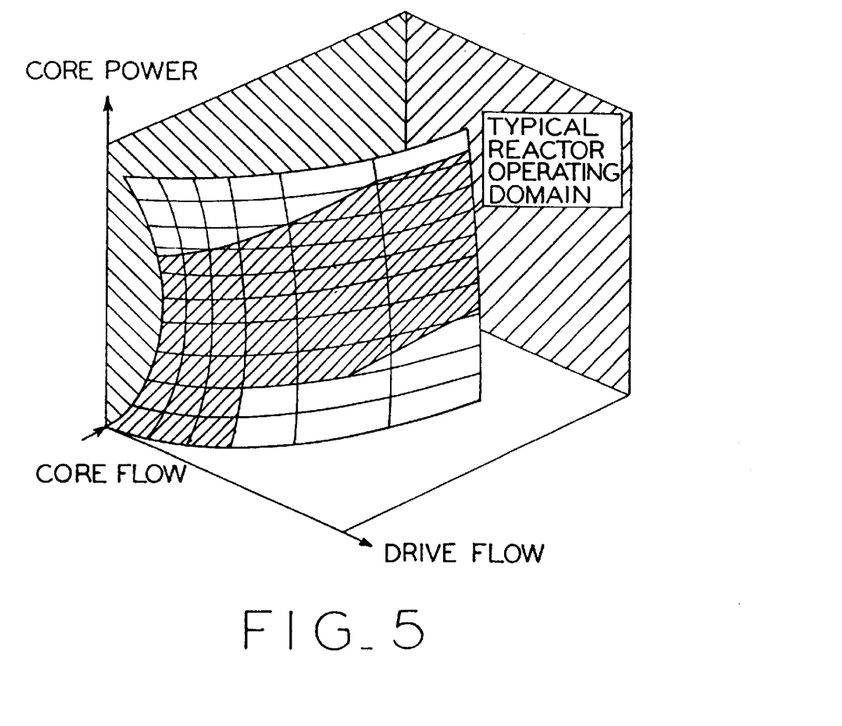
FIG. 5 illustrates a BWR operating surface.

As illustrated in FIG. 5, this surface, termed the reactor operating surface, uniquely defines the relationship between core flow, core power, and drive flow. These parameters correspond to the IPM general formulation parameters $x_1$, $x_2$ and $x_3$ of Equation 4. The dark shaded area in FIG. 5 represents the system operating envelope and is termed the reactor operating domain.

Existing Control System Design

Figure 6:
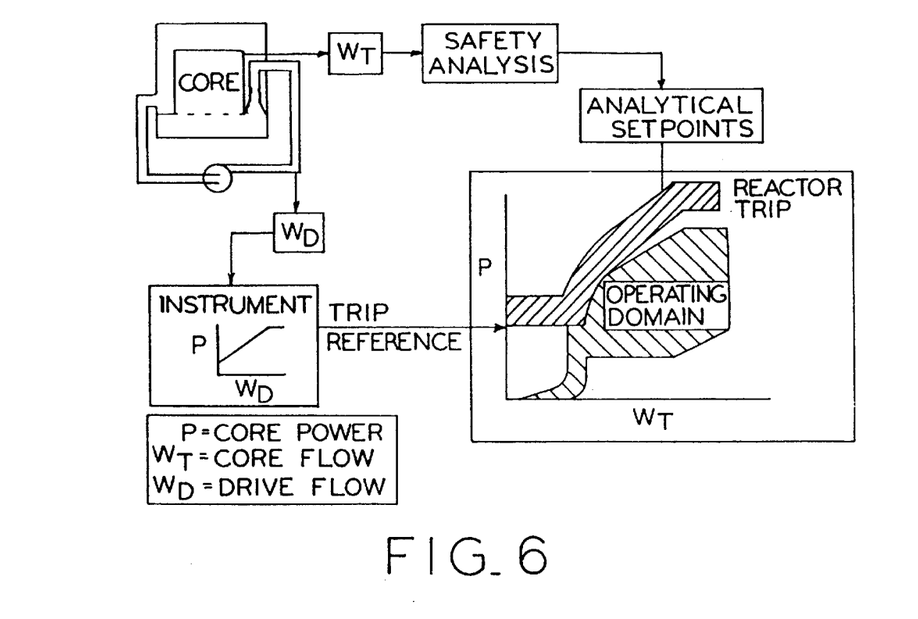
FIG. 6 illustrates BWR biased over-power protection.
Figure 7:
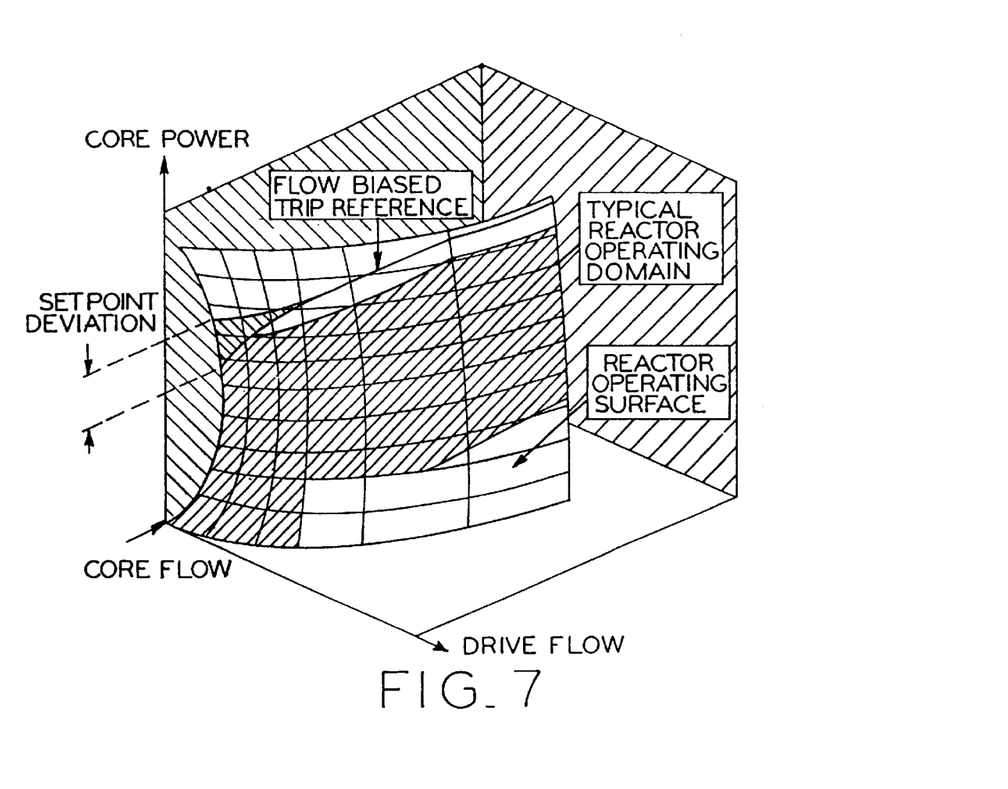
FIG. 7 illustrates flow biased trip reference setpoint deviation.

FIG. 6 illustrates the relationship between the analytical methods and the instrumentation architecture used to generate the flow dependant overpower trip setpoint function, i.e., the IPM general formulation system setpoint function. The existing plant instrumentation that is used to generate flow-dependent trip setpoint functions utilizes the reactor recirculation system drive flow as a proportional approximation of core flow which is the reactor system parameter relevant to the protection function safety analysis. This approach results in discrepancies between actual instrumentation trip setpoints, analytical setpoints, and operational expectations. These discrepancies derive from the fact that jet pumps are inefficient at low drive flows, and require large changes in drive flow in order to influence the total flow. The relationship between core flow and drive flow is not only a function of drive flow, but also core power. Power dependent coolant density differences and two-phase flow losses alter the reactor system thermal-hydraulic behavior in the absence of external influence. As a result, the total core flow that is observed for a given drive flow can be strong function of core power. These non-linearities are illustrated in FIG. 7 for the BWR flow-dependent reactor trip setpoint function.

IPM Application Process to Flow Mapping

Figure 8:
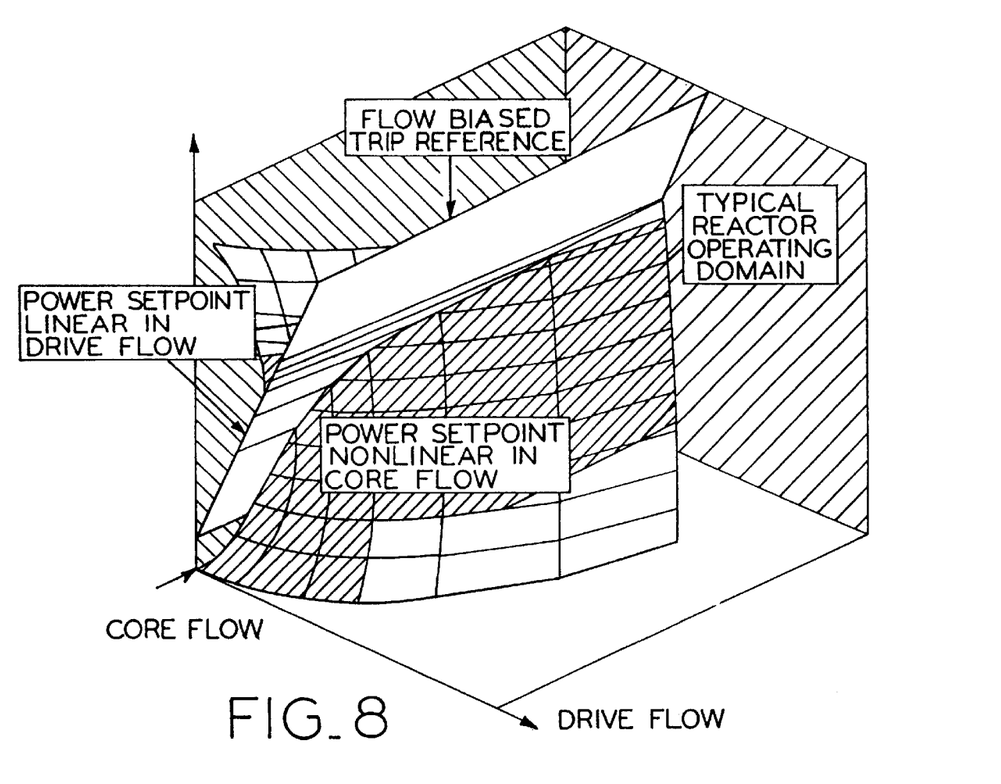
FIG. 8 illustrates a reactor operator surface.

To improve the existing instrumentation setpoint accuracy, the steady-state dependency between the relevant system parameters is first determined, as illustrated in FIG. 8. Considering these dependencies, a relationship between the instrumentation input signal, recirculation system drive flow ($W_D$), and the independent variable defining the trip setpoint, i.e., core flow ($W_T$), is established. This provides the IPM general formulation parametric mapping function relationship, termed the flow mapping function, relating $W_D$ to $W_T$ at the trip setpoint core power, in accordance with Equation 7:

$$W_T = f_{FMF}(W_D)|_{P_{setpoint}}. \tag{16}$$

The flow mapping function is derived using a single constraint condition, by evaluating the reactor system model at the trip setpoint function power. Defining the relationship at this power level provides the mechanism for implicitly addressing the parametric dependency of $W_T$ and $W_D$ on power in a manner consistent with the requirements of the control system. The flow mapping function is then inserted into the expression for the setpoint trip function (see Equation 3), which is derived analytically as a function of core flow from safety analysis:

$$P_{setpoint} = g_{sp}(W_T) \tag{17}$$

The resulting closed-form function, termed the trip reference function, i.e., the setpoint reference function in the IPM general formulation, is given by:

$$P_{setpoint} = g_{sp}(f_{FMF}(W_D)). \tag{18}$$

The trip reference function is the application-specific form of Equation 8. The implicit modeling of the core flow parameter in the determination of the trip setpoint function provides accurate setpoint representation that fully compensates for the setpoint deviation illustrated in FIG. 7.

Because alterations in core loading, operating strategy, and reactor system age can affect the quasi-steady state system pressure drop distribution and component form losses, long-term changes in the reactor operating domain may occur. To accommodate time-dependent changes in recirculation system performance, a drive flow alignment algorithm is derived, consistent with Equation 11. This algorithm adjusts the instrumentation input signal based on measured deviations from the benchmarked baseline performance characteristics that are utilized in determining the flow mapping function. By providing a separate means of adjusting the instrumentation signal processing, the flow mapping function is permitted to remain time-invariant. The drive flow alignment algorithm is given by:

$$W_D^{aligned} = W_D^{input} + \Delta W_D, \tag{19}$$

where $\Delta W_D$ is established based on a comparison of surveillance test data to the benchmarked reactor baseline performance. The resulting updated reactor baseline flow performance is incorporated into the implicit modeling of the core flow parameter when the aligned drive flow of Equation 19 is applied in Equation 18 to determine the trip reference function:

$$P_{setpoint} = g_{sp}(f_{FMF}(W_D^{input} + \Delta W_D)). \tag{20}$$

Figure 9:
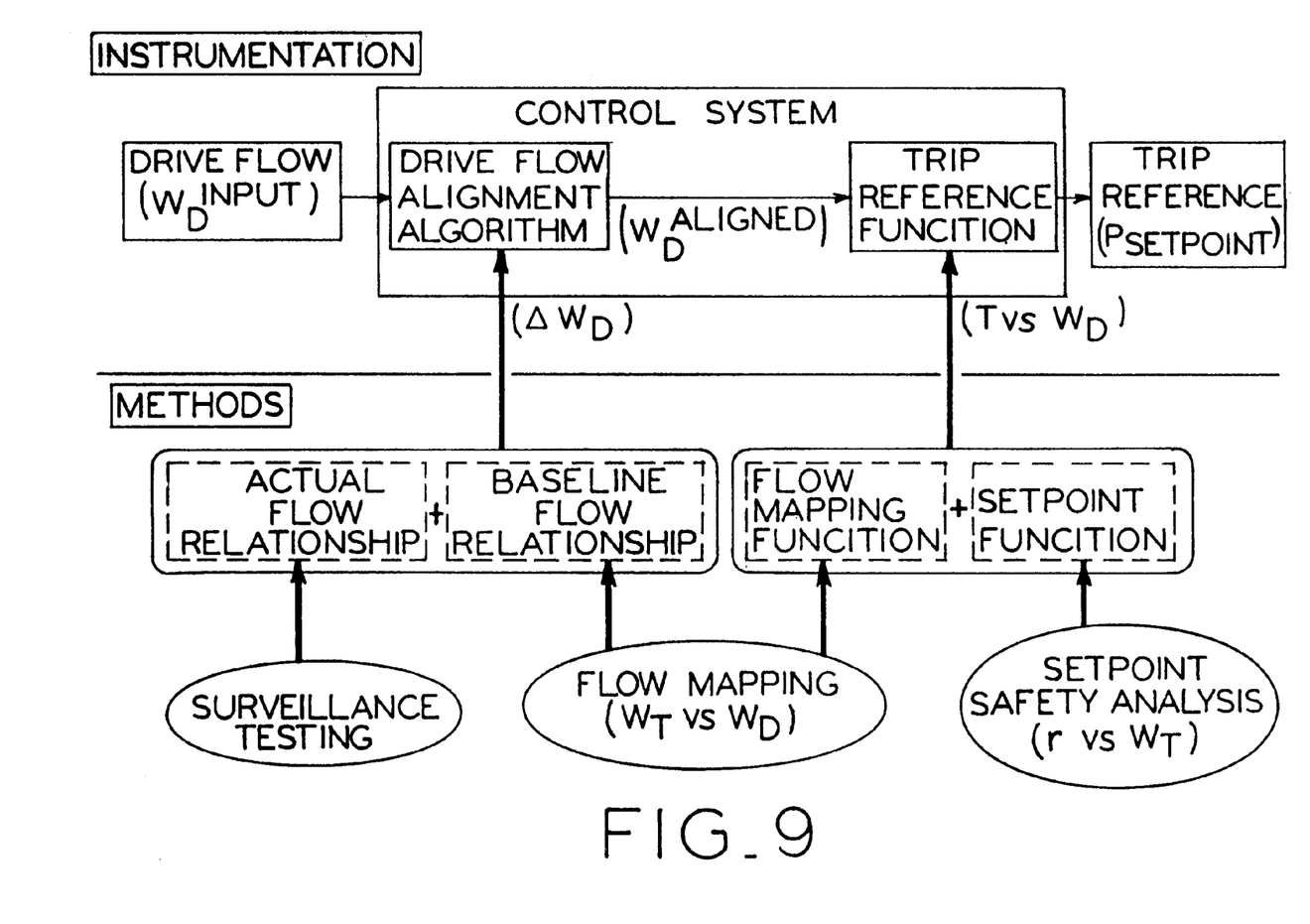
FIG. 9 illustrates application of implicit parametric modeling to BWR protection system instrumentation.

The aligned trip reference function is the application-specific form of Equation 12. FIG. 9 provides an overview of the application of implicit parametric modeling to the BWR overpower protection system instrumentation. The trip reference setpoint is explicitly derived by the instrumentation control system as a function of the input recirculation drive flow. The core flow parameter is implicitly accounted for by the time-invariant flow mapping function and the drive flow alignment algorithm. Any time-dependent variation in reactor flow performance is accommodated by appropriate adjustments to the drive flow alignment algorithm.

Flow Mapping Elements

To facilitate the BWR flow mapping application of the IPM methodology, the reactor operating surface in FIG. 5 is decoupled into two related functions of a single independent parameter. These functions correspond to the alignment reference trajectory of Equation 9. The reactor operating surface is first reduced to the standard two-dimensional core power/core flow operating domain. The setpoint functions, i.e., the system setpoint function of the IPM general formulation, which analytically relate the flow-biased trip reference setpoints to core flow, are defined to maintain reactor operation in this domain. The suppressed reactor operating surface dimension, drive flow, is presented on the core power/core flow operating surface as curved lines of constant drive flow, referred to as power control lines. It is appropriate and practical for this application to identity selected power control lines which express the reactor operating surface dependence on drive flow within the flow mapping methodology. These lines are termed reference power control lines. Second, the reactor operating domain is reduced to a two-dimensional relationship defined by core flow and drive flow. The BWR flow mapping application methodology defines a reference flow line in the core flow/drive flow operating space, which relates core flow values to corresponding drive flow values, when referenced to a unique trajectory in the reactor operating domain. This trajectory, termed the Reference Flow Control Line, defines core power for each point on the reference flow line. This formulation corresponds to the alignment reference trajectory of the IPM general formulation (see Equation 9).

Figure 10:
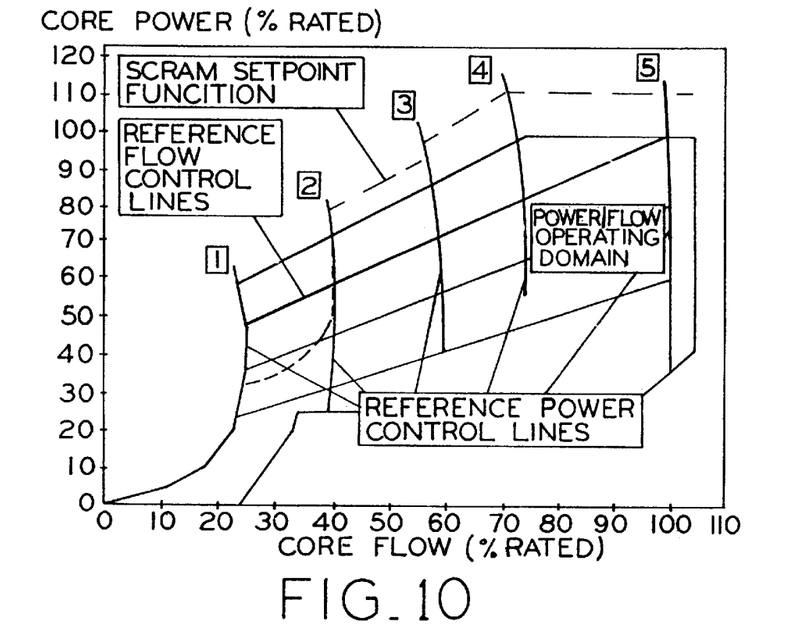
FIG. 10 illustrates reference power and flow control lines.
Figure 11:
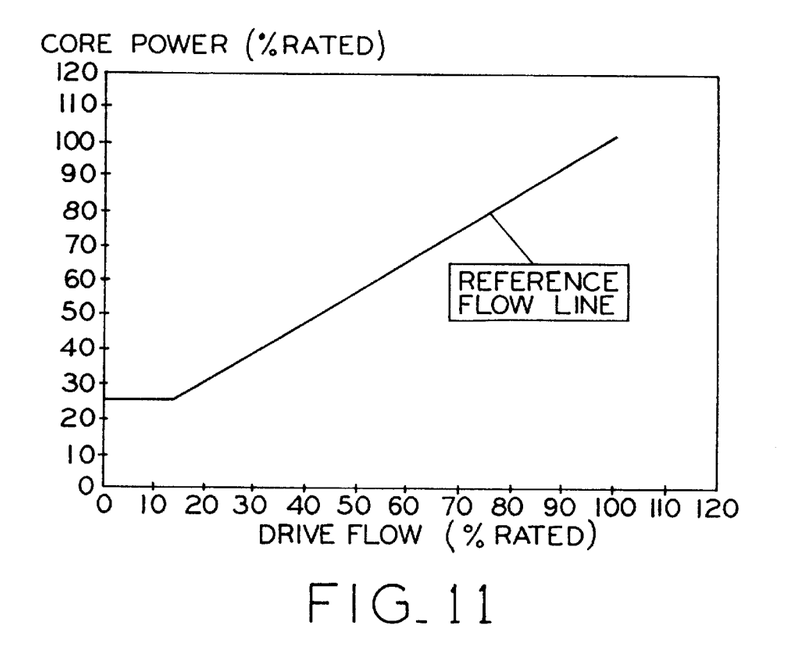
FIG. 11 illustrates a reference flow line.

A typical core power/core flow reactor operating domain, including representative reference power control lines and a reference flow control line, is illustrated in FIG. 10. An example setpoint function also is shown in FIG. 10. A typical reference flow line in the core flow to drive flow space is depicted in FIG. 11. The reference power control lines and the reference flow function, which is defined by the reference flow control line and the reference flow line, comprise the flow mapping elements used to generate the drive flow to core flow mapping relationship.

The reference power control lines relate state points in the operating domain to the trip reference function which lies outside the domain. The reference power control lines are therefore based on an analytical model associated with the reactor operating surface:

$$W_T = f_{SURF}^{ANA}(P, W_D). \tag{21}$$

The reference flow function which is defined inside the reactor operating domain can, on the other hand, be directly related to actual operating state conditions. It is advantageous to define the reference flow function on an operating surface expressed as the empirical reactor operating surface:

$$W_T = f_{SURF}^{EMP}(P, W_D). \tag{22}$$

This approach optimizes the alignment process of the control system for the system baseline application by, in effect, updating the analytical model based on the most recent reactor empirical data. The analytical reactor operating surface will not generally coincide with the empirical reactor operating surface. The differences between the two surfaces are predominantly due to modeling approximations and the degree to which the actual reactor pressure drop distribution and component form efficiencies are modeled.

Flow Mapping Formulation

The general expressions developed in accordance with the IPM methodology are used to form the BWR flow mapping application detailed formulation. The analytical reactor operating surface discussed above spans the full recirculation flow range from natural circulation to maximum core flow. The dependency of this surface curvature on drive flow is weak and well behaved, and is shown to conform to a tight criterion in accordance with Equations 13 and 14. Plant-specific reference power control lines are explicitly established for predetermined drive flow values on the analytical reactor operating surface. Since power control lines are evaluated at the setpoint junction in the process of establishing the flow mapping functions, the set of reference power control lines are selected based on the location of critical points along the setpoint functions. For the example application five reference power control lines associated with these conditions are illustrated in FIG. 10, and are given by:

$$W_T = f^j_{RPCL}(P), \ j = 1, \ldots, 5. \tag{23}$$

The power control lines for conditions other than those defined by the reference power control lines are established for this example application by linear interpolation of the two adjacent reference power control lines without sacrificing accuracy. Denoting two adjacent reference power control lines as $f_{RPCL}{}^n$, and $f_{RPCL}{}^{n+1}$, the linearly interpolated power control line for any drive flow, $W_D$, between the corresponding two constant drive flow values, $W_D{}^n$ and $W_D{}^{n+1}$, is:

$$W_T = \left[\frac{W_D^{n+1} - W_D}{W_D^{n+1} - W_D^n}\right] \cdot f^n_{RPCL}(P) + \left[\frac{W_D - W_D^n}{W_D^{n+1} - W_D^n}\right] \cdot f^{n+1}_{RPCL}(P), \tag{24}$$

where n=1,2,3, or 4. This formulation provides the relationship between core power and core flow, parametric in drive flow.

The reference flow function shape is dependent on the unique reactor state trajectory in the core power/core flow operating domain. The trajectory chosen for the flow mapping application simplifies the functional form of the reference flow line, and is defined to be the 100 percent flow control line. The reference flow line, which is a unique, time-invariant relationship between core flow and drive flow is defined along this reference flow control line. Since the data used to formulate the reference flow line does not generally lie on the reference flow control line, it is mapped onto it using Equation 24. The result is a set of adjusted, empirical, core flow versus drive flow data along the reference flow control line which is modeled to generate the reference flow line.

The flow mapping function identifies the setpoint function core flow associated with the reference flow function drive flow. Following the IPM methodology, the flow mapping function is generated by substituting the setpoint function of Equation 17, which relates the core power parameter to the core flow parameter, into the reference power control line function of Equation 24 to eliminate the core power variable:

$$W_T = \left[\frac{W_D^{n+1} - W_D}{W_D^{n+1} - W_D^n}\right] \cdot f^n_{RPCL}(g^i_{sp}) + \left[\frac{W_D - W_D^n}{W_D^{n+1} - W_D^n}\right] \cdot f^{n+1}_{RPCL}(g^i_{sp}). \tag{25}$$

The setpoint function, $g_{sp}$, of Equation 17, is generalized as $g_{sp}{}^i$ to represent i different setpoint functions. The expression $f_{RPCL}{}^n(g_{SP}{}^i)$ represents the core flow value at the intersection of setpoint function i and reference power control line n. The constant drive flow values in Equation 25, $W_D{}^n$ and $W_D{}^{n+1}$ are defined by the reference flow line at the intersection of the corresponding reference power control lines, n and n+1, with the reference flow control line.

Equation 25 is simplified by defining $f_{RPCL}{}^n(g_{SP}{}^i)$, the core flow value at the intersection of setpoint function i and reference power control line n, as $W_T{}^{i,n}$. After rearrangement:

$$W_T = \left[\frac{W_D^{n+1} \cdot W_T^{i,n} - W_D^n \cdot W_T^{i,n+1}}{W_D^{n+1} - W_D^n}\right] + \left[\frac{W_T^{i,n+1} - W_T^{i,n}}{W_D^{n+1} - W_D^n}\right] W_D. \tag{26}$$

Equation 26 is the setpoint-specific flow mapping function relating the core flow at the flow-biased trip reference setpoint to the reference flow function drive flow.

Trip Reference Setpoint Generation

The APRM flow-dependent trip reference function is obtained by substituting the flow mapping function, Equation 26, into the setpoint function, $g_{SP}{}^i$, Equation 17:

$$P = g^i_{sp} \left\{ \left[\frac{W_D^{n+1} W_T^{i,n} - W_D^n W_T^{i,n+1}}{W_D^{n+1} - W_D^n}\right] + \left[\frac{W_T^{i,n+1} - W_T^{i,n}}{W_D^{n+1} - W_D^n}\right] W_D \right\}. \tag{27}$$

where the constant drive flow values, $W_D{}^n$ and $W_D{}^{n+1}$, are defined by the reference flow line at the intersection of the corresponding reference power control lines.

Each APRM flow-dependent trip reference function is generated by first segmenting the setpoint function consistent with the choice of the reference power control lines and then applying the flow mapping function to each segment separately. As an example, the application is demonstrated for a linear sloped segment of the setpoint function of slope m and intercept I, $$P = I + m \cdot W_T. \tag{28}$$

The flow mapping function, Equation 26, is substituted into Equation 28 to form the trip reference function for a straight setpoint function segment as:

$$P = I + m \left\{ \left[\frac{W_D^{n+1} W_T^{i,n} - W_D^n W_T^{i,n+1}}{W_D^{n+1} - W_D^n}\right] + \left[\frac{W_T^{i,n+1} - W_T^{i,n}}{W_D^{n+1} - W_D^n}\right] W_D \right\}. \tag{29}$$

To facilitate the implementation of the flow mapping process, Equation 29 is expressed in terms of the power values at the setpoint function segment endpoints, $P_n{}^i$ and $P_{n+1}{}^i$, instead of the core flow values, $W_T{}^{i,n}$ and $W_T{}^{i,n+1}$. This transformation also accommodates the special case of a discontinuous setpoint function, i.e., one that contains a vertical line segment of undefined slope. The core power and flow are related along the setpoint function by Equation 28, and specifically at the straight line segment endpoint by:

$$P_n^i = I + m \cdot W_T^{i,n}. \tag{30}$$

This relation is substituted to express Equation 29 in terms of the core power values at the segment endpoints as:

$$P = \left[\frac{W_D^{n+1} \cdot P_n^i - W_D^n \cdot P_{n+1}^i}{W_D^{n+1} - W_D^n}\right] + \left[\frac{P_{n+1}^i - P_n^i}{W_D^{n+1} - W_D^n}\right] \cdot W_D. \tag{31}$$

The APRM flow-dependent setpoint functions, expressed as a function of core flow, generally consist of several zones. Each zone has a unique setpoint algorithm derived from the analytical basis for that zone's setpoint. Each setpoint function zone is divided into a number of setpoint function segments consistent with the interpolation requirements of the reference power control lines. The type of flow mapping required depends on the segment's functional form and the reference power control lines used to generate the trip reference function for that segment.

Figure 12:
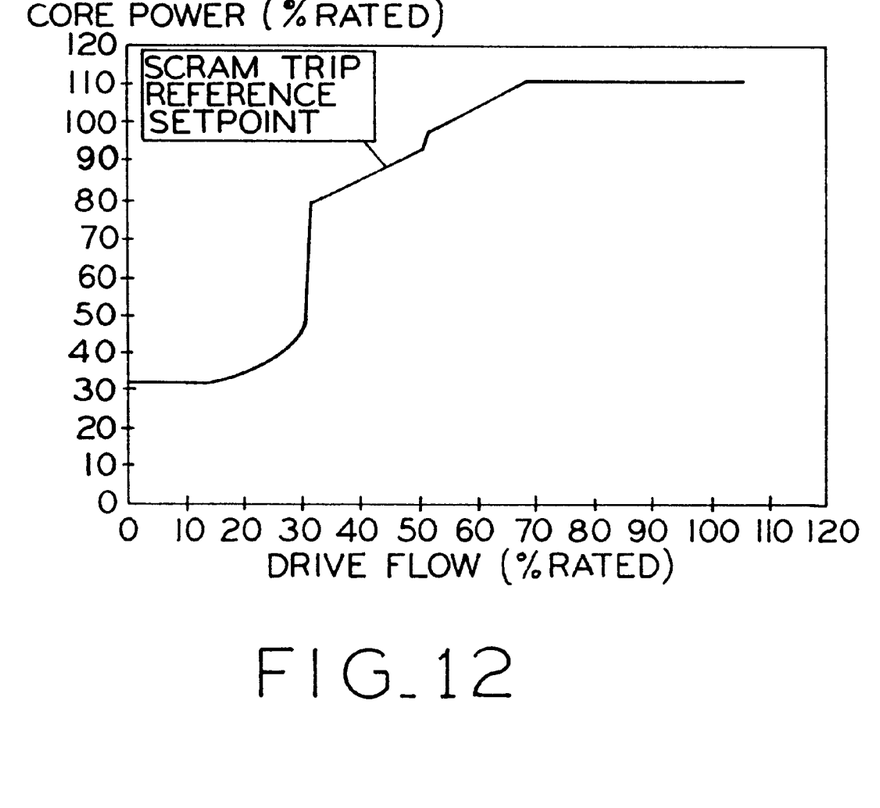
FIG. 12 illustrates a trip reference function.

FIG. 12 illustrates an example APRM flow-dependent trip reference function that results from mapping the system implicit parameter, core flow, into the input process parameter, drive flow, at the system setpoint function using the IPM methodology. A comparison to the setpoint function in FIG. 10 illustrates the affect of the IPM mapping process. Reactor trips initiated by the APRM flow-dependent trip reference function conform to the analytical requirements within significantly reduced uncertainly. This improvement in accuracy is a direct result of addressing the parametric dependency between the system parameters shown in FIGS. 10 and 11.

Drive Flow Alignment

The application of the methodology to perform drive flow alignment is demonstrated using an example of updated reactor performance data at two state conditions. The updated reactor state information is selected near 40 percent core flow and 100 percent rated core power, and normalized onto the reference flow control line. The data defines a surveillance flow line that is compared to the reference flow line to generate a drive flow bias parametric in the reference flow line drive flow. The drive flow bias values are evaluated at 40 and 100 percent rated core flow.

The drive flow alignment process is based on identification of long-term recirculation system flow performance deviations from the reference flow function. Flow performance deviations are quantified relative to the sloped segment of the reference flow line. The natural circulation core flow at the reference flow control line is assumed unchange. The sloped segment of the reference flow line is described by the linear function:

$$W_T = a + b \cdot W_D. \tag{32}$$

Temporal changes in recirculation system performance from this baseline reference are quantified with reactor system flow performance data that is normalized onto the reference flow control line using the appropriate reference power control lines. The resulting adjusted data reflect current reactor state conditions on the reference flow control line. These state conditions are now directly compared to the reference flow line to assess any plant performance deviations from the reference baseline. Reactor state points corresponding to the adjusted data do not, in general, lie on the reference flow line described by Equation 32 because of the changing recirculation system performance. The surveillance flow line is therefore defined as:

$$W_T = \alpha + \beta \cdot W_D, \tag{33}$$

where $\alpha$ and $\beta$ are determined based on the normalized flow performance data.

A common core flow on the surveillance flow line and the reference flow line is associated with different drive flow values. This difference in drive flow is defined as a drive flow bias, $\Delta W_D$. Since the time-invariant flow mapping function is based on the reference flow line, the surveillance flow line must be aligned to the reference flow line so that the appropriate (implicit) core flow, and therefore the flow-biased trip reference setpoint, is identified by the control system. The drive flow bias is derived, according to Equation 11, by equaling the reference flow line to the surveil lance flow line for the same core flow, and is expressed as a function of the reference flow line drive flow:

$$\Delta W_D = \frac{\alpha - a}{\beta} + \frac{\beta - b}{\beta} \cdot W_D. \tag{34}$$

The instrumentation control system aligns the input drive flow based on discrete selection of the drive flow alignment settings, $\Delta_D^{40}$ and $\Delta_D^{100}$, in this example application, corresponding to 40 and 100 percent rated core flow. These settings are determined by rounding two drive flow bias values, $\Delta W_D^{40}$ and $\Delta W_D^{100}$, to the nearest available setting value. $\Delta W_D^{40}$ and $\Delta W_D^{100}$ are calculated from Equation 34 by substituting in the reference flow line drive flows $W_D^{40}$ and $W_D^{100}$, corresponding to 40 and 100 percent rated core flow, respectively. $W_D^{40}$ and $W_D^{100}$ are time-invariant parameters obtained from the reference flow function, Equation 32, and are termed drive flow alignment constants. The aligned drive flow, $W_D^-$, can be shown to be related to the input drive flow, $W_D$, in terms of the drive flow alignment settings and constants as:

$$W_D = \left[ \frac{\Delta_D^{40} \cdot W_D^{100} - \Delta_D^{100} \cdot W_D^{40}}{(W_D^{100} - W_D^{40}) - (\Delta_D^{100} - \Delta_D^{40})} \right] + \left[ \frac{W_D^{100} - W_D^{40}}{(W_D^{100} - W_D^{40}) - (\Delta_D^{100} - \Delta_D^{40})} \right] \cdot W_D^-. \tag{35}$$

From the preceding description of the present invention, it is evident that the objects of the invention are attained. Although the invention has been described and illustrated in detail, it is to be clearly understood that the same is intended by way of illustration and example only and is not be taken by way of limitation. Accordingly, the spirit and scope of the invention are to be limited only by the terms of the appended claims.

What is claimed is:

1. A method for generating a system setpoint reference function for a boiling water reactor system, said method comprising the steps of:

generating a parametric model of the system;

defining a time-invariant parametric mapping function; and generating an interface protocol to adjust the time-invariant parametric mapping function to account for any time-dependent variations between an input process parameter and an implicit system parameter.

2. A method in accordance with claim 1 wherein the system implicit parameter, a system setpoint parameter, and the input process parameter are utilized in generating the parametric model.

3. A method in accordance with claim 1 wherein the mapping function is generated using the parametric model to relate a system setpoint parameter at a system setpoint function to the input process parameter implicit in the system implicit parameter.

4. A method in accordance with claim 3 wherein relating the system setpoint parameter to the input process parameter comprises the step of collapsing a three dimensional system operating surface into a two-dimensional space defined by the control system input process parameter and the system setpoint parameter.

5. A method in accordance with claim 4 wherein collapsing the three dimensional system operating surface is performed along the system setpoint function.

6. A method for generating a system setpoint reference function for a boiling water reactor system, said method comprising the steps of:
   generating a parametric model of the system using a system implicit parameter, $x_1$, a system setpoint parameter, $x_2$, and an input process parameter, $X_3$, wherein a system operating surface is described by the relationship of $x_1$, $x_2$, and $x_3$;
   defining a time-invariant parametric mapping function; and
   generating an interface protocol to adjust the time-invariant parametric mapping function to account for any time-dependent variations between the input process parameter and the system implicit parameter.

7. A method in accordance with claim 6 wherein the system operating surface is defined as:

$$S(x_1, x_2, x_3) = \text{Constant},$$

where parameter $x_1$ is the system implicit parameter and is an independent variable of a system setpoint function, parameter $x_2$ is the system setpoint parameter, and parameter $x_3$ is the input process parameter.

8. A method in accordance with claim 7 wherein the system setpoint function is defined as:

$$x_2 = g_{SSF}(x_1).$$

9. A method in accordance with claim 8 wherein for a given value of the input process parameter, the system implicit parameter is directly related to the system setpoint parameter by:

$$x_1 = F(x_2, x_3').$$

10. A method in accordance with claim 9 wherein the parametric mapping function is:

$$x_1 = \Omega_{PMF}(x_3).$$

11. A method in accordance with claim 10 wherein the setpoint reference function is:

$$x_2 = g_{SSF}(\Omega_{PMF}(x_3)).$$

12. A method in accordance with claim 11 wherein generating an interface protocol comprises the step of defining an alignment reference trajectory inside the system operating envelope as:

$$x_2 = g_{ART}(x_1).$$

$$x_1 = f_{ART}(x_3).$$

13. A method in accordance with claim 12 wherein generating an interface protocol comprises the step of generating an alignment measured trajectory defined as:

$$x_2 = g_{ART}(x_1).$$

$$x_1 = f_{ART}(x_3).$$

14. A method in accordance with claim 13 wherein an alignment correction, $\Delta_{ALIGN}$, is established as a function of the measured input process parameter value ($\tilde{x}_3$), by conserving the implicit system parameter value, $x_1$:

$$f_{AMT}(\tilde{x}_3) = f_{ART}(\tilde{x}_3 = \Delta_{ALIGN}).$$

15. A method in accordance with claim 14 wherein compensations for any system performance changes are incorporated by the alignment correction as:

$$x_2 = g_{SSF}(\Omega_{PMF}(\tilde{x}_3 = \Delta_{ALIGN})),$$

where $\tilde{x}_3$ is the measured value of the input process parameter.

16. A method in accordance with claim 15 wherein criterion for continued applicability of the parametric mapping function requires that the system model satisfies:

$$\left| \frac{d}{dx_2} F(x_2, x_3') \right|_{x_2}^{analytical} - \left. \frac{d}{dx_2} F(x_2, x_3') \right|_{x_2}^{empirical} \right| \leq \epsilon,$$

for any value of $x_3'$, where $\epsilon$ is sufficiently small, and $x_2^{analytical}$ and $x_2^{empirical}$ refer to the analytical system model value and the measured value of the system setpoint parameter at a common $x_3'$ value.

17. A method in accordance with claim 16 wherein trajectories on the system operating surface are equivalent to empirical values of the input process parameter if:

$$\left| x_3^{empirical} - x_3^{analytical} \right|_{x_1', x_2'} \leq \delta,$$

where $x_1'$ and $x_2'$ represent any common point and $\delta$ is defined consistent with $\epsilon$.

18. A method for determining reactor trip setpoints as a function of reactor coolant recirculation flow, said method comprising the steps of:
   generating a parametric model of the system, the parametric model including core flow, $W_T$, core power, P, and recirculation drive flow, $W_D$, related by:

$$W_T = f_{SURF}(P, W_D);$$

and
   defining a time-invariant parametric mapping function as:

$$W_T = \left[ \frac{W_D^{n+1} \cdot W_T^{i,n} - W_D^n \cdot W_T^{i,n+1}}{W_D^{n+1} - W_D^n} \right] + \left[ \frac{W_T^{i,n+1} - W_T^{i,n}}{W_D^{n+1} - W_D^n} \right] W_D,$$

where a core flow value at the intersection of setpoint function i and reference power control line n, is designated as $W_T^{i,n}$.

19. A method in accordance with claim 18 wherein the trip reference function is:

$$P = \left[ \frac{w_D^{n+1} \cdot P_n^i - W_D^n \cdot P_{n+1}^i}{W_D^{n+1} - W_D^n} \right] + \left[ \frac{P_{n+1}^i - P_n^i}{W_D^{n+1} - W_D^n} \right] \cdot W_D.$$

20. A method for generating a system setpoint reference function for controlling a boiling water reactor system in a nuclear power plant, said method comprising the steps of:
   generating a parametric model of the system using a system implicit parameter, a system setpoint parameter, and an input process parameter;
   defining a time-invariant parametric mapping function; and
   generating an interface protocol to adjust the time-invariant parametric mapping function to account for any time-dependent variations between the input process parameter and the system implicit parameter.

21. A method in accordance with claim 20 wherein the parametric model includes core flow, $W_T$, core power, P, and recirculation drive flow, $W_D$, related by:

$$W_T = f_{SURF}(P, W_D).$$

22. A method in accordance with claim 20 wherein the time-invariant parametric mapping function is defined as:

$$W_T = \left[ \frac{W_D^{n+1} \cdot W_T^{i,n} - W_D^n \cdot W_T^{i,n+1}}{W_D^{n+1} - W_D^n} \right] + \left[ \frac{W_T^{i,n+1} - W_T^{i,n}}{W_D^{n+1} - W_D^n} \right] W_D;$$

where a core flow value at the intersection of setpoint function i and reference power control line n, is designated as $W_T^{i,n}$.

23. A method in accordance with claim 20 wherein the interference protocol produces a trip reference setpoint function defined as:

$$P = \left[ \frac{W_D^{n+1} \cdot P_n^i - W_D^n \cdot P_{n+1}^i}{W_D^{n+1} - W_D^n} \right] + \left[ \frac{P_{n+1}^i - P_n^i}{W_D^{n+1} - W_D^n} \right] \cdot W_D;$$

where $P_n^i$ represents the core power value at the intersection of set point i and reference power control line n.

* * * * *